US010956593B2

(12) United States Patent
Piccinini et al.

(10) Patent No.: US 10,956,593 B2
(45) Date of Patent: Mar. 23, 2021

(54) SHARING OF DATA AMONG CONTAINERS RUNNING ON VIRTUALIZED OPERATING SYSTEMS

(71) Applicant: International Business Machines Corporation, Armonk, NY (US)

(72) Inventors: Sandro Piccinini, Rome (IT); Ilaria Gorga, Rome (IT); Fabio Barillari, Rome (IT); Francesca Ziantoni, Vicovaro (IT)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 15/897,193

(22) Filed: Feb. 15, 2018

(65) Prior Publication Data

US 2019/0250835 A1 Aug. 15, 2019

(51) Int. Cl.
*G06F 21/62* (2013.01)
*G06F 21/78* (2013.01)
*G06F 3/06* (2006.01)
*G06F 12/14* (2006.01)

(52) U.S. Cl.
CPC .......... *G06F 21/6218* (2013.01); *G06F 21/78* (2013.01); *G06F 3/067* (2013.01); *G06F 3/0622* (2013.01); *G06F 3/0643* (2013.01); *G06F 3/0644* (2013.01); *G06F 3/0659* (2013.01); *G06F 3/0665* (2013.01); *G06F 12/1425* (2013.01); *G06F 2212/1052* (2013.01)

(58) Field of Classification Search
CPC .... G06F 21/6218; G06F 21/78; G06F 3/0643; G06F 3/067; G06F 3/0622; G06F 3/0644; G06F 3/0659
See application file for complete search history.

(56) References Cited

U.S. PATENT DOCUMENTS 7,162,476 B1 * 1/2007 Belair ...................... G06F 9/54
7,739,312 B2 6/2010 Gordon et al.
(Continued)

FOREIGN PATENT DOCUMENTS

CN 105893205 A 8/2016

OTHER PUBLICATIONS

J. -F. Rajotte and R. T. Ng, "Private data sharing between decentralized users through the privGAN architecture," 2020 IEEE 24th International Enterprise Distributed Object Computing Workshop (EDOCW), Eindhoven, Netherlands, 2020, pp. 37-42. (Year: 2020).*
(Continued)

*Primary Examiner* — Karl L Schmidt
(74) *Attorney, Agent, or Firm* — Scott S. Dobson (57) ABSTRACT

A solution is proposed for managing containers isolating corresponding application environments from one or more shared operating systems in a computing system. One or more relevant groups are determined among one or more candidate groups (each comprising private data in common among a plurality of the containers); the candidate groups are determined according to corresponding access commands submitted by the containers and the relevant groups are determined according to one or more relevance policies. The private data of the relevant groups are consolidated into corresponding shared data.

20 Claims, 6 Drawing Sheets

(56) References Cited

U.S. PATENT DOCUMENTS

| | | | | |
|---|---|---|---|---|
| 7,822,781 | B2* | 10/2010 | Greene | H04L 63/102 |
| | | | | 707/802 |
| 8,209,506 | B2* | 6/2012 | Yueh | G06F 3/0608 |
| | | | | 711/162 |
| 8,505,031 | B2* | 8/2013 | Klissner | G06F 9/45537 |
| | | | | 719/313 |
| 8,522,205 | B2* | 8/2013 | Lari | G06F 8/61 |
| | | | | 717/120 |
| 8,838,882 | B1* | 9/2014 | Quong | G06F 12/0802 |
| | | | | 711/103 |
| 8,954,398 | B1 | 2/2015 | Zhang et al. | |
| 8,959,579 | B2* | 2/2015 | Barton | G06F 21/6218 |
| | | | | 726/1 |
| 9,015,212 | B2* | 4/2015 | David | G06F 3/0611 |
| | | | | 707/827 |
| 9,116,803 | B1* | 8/2015 | Agrawal | G06F 11/0751 |
| 9,129,095 | B1* | 9/2015 | Lam | G06F 21/6218 |
| 9,424,058 | B1* | 8/2016 | Wasson | G06F 9/455 |
| 10,032,032 | B2* | 7/2018 | Suarez | G06F 21/562 |
| 10,289,438 | B2* | 5/2019 | Frye, Jr. | G06F 9/45558 |
| 10,445,292 | B1* | 10/2019 | Zhang | G06F 16/1748 |
| 2002/0173984 | A1* | 11/2002 | Robertson | H04L 67/34 |
| | | | | 709/220 |
| 2003/0225788 | A1 | 12/2003 | Kawakami et al. | |
| 2006/0085530 | A1* | 4/2006 | Garrett | G06F 11/3495 |
| | | | | 709/223 |
| 2007/0226444 | A1* | 9/2007 | Yagawa | G06F 3/067 |
| | | | | 711/170 |
| 2007/0250784 | A1* | 10/2007 | Riley | G06Q 10/10 |
| | | | | 715/764 |
| 2008/0282032 | A1* | 11/2008 | Shen | G06F 12/0811 |
| | | | | 711/117 |
| 2009/0037554 | A1* | 2/2009 | Herington | G06F 9/4856 |
| | | | | 709/213 |
| 2010/0281083 | A1* | 11/2010 | Purtell, II | G06F 16/122 |
| | | | | 707/822 |
| 2011/0010514 | A1* | 1/2011 | Benhase | G06F 3/061 |
| | | | | 711/162 |
| 2011/0066654 | A1* | 3/2011 | Chandrasekar | G06F 16/86 |
| | | | | 707/792 |
| 2011/0185292 | A1* | 7/2011 | Chawla | G06F 9/452 |
| | | | | 715/760 |
| 2012/0216052 | A1* | 8/2012 | Dunn | G06F 21/78 |
| | | | | 713/193 |
| 2012/0291090 | A1* | 11/2012 | Srinivasan | G06F 21/604 |
| | | | | 726/1 |
| 2013/0159596 | A1* | 6/2013 | Van De Ven | G06F 12/109 |
| | | | | 711/6 |
| 2013/0191830 | A1* | 7/2013 | Mann | G06F 9/54 |
| | | | | 718/1 |
| 2013/0198459 | A1* | 8/2013 | Joshi | G06F 12/084 |
| | | | | 711/130 |
| 2013/0205028 | A1* | 8/2013 | Crockett | G06F 9/5027 |
| | | | | 709/226 |
| 2013/0219456 | A1* | 8/2013 | Sharma | H04L 63/0815 |
| | | | | 726/1 |
| 2014/0108793 | A1* | 4/2014 | Barton | G06F 21/6218 |
| | | | | 713/165 |
| 2014/0373092 | A1* | 12/2014 | Hussain | G06F 9/5072 |
| | | | | 726/3 |
| 2015/0052144 | A1* | 2/2015 | Mad; Francesco | G06F 16/285 |
| | | | | 707/740 |
| 2015/0067283 | A1* | 3/2015 | Basu | G06F 3/061 |
| | | | | 711/162 |
| 2015/0089620 | A1* | 3/2015 | Manza | H04L 63/0815 |
| | | | | 726/8 |
| 2015/0205678 | A1 | 7/2015 | Kottomtharayil et al. | |
| 2016/0139737 | A1* | 5/2016 | Conn | G06F 3/0481 |
| | | | | 715/802 |
| 2016/0162320 | A1 | 6/2016 | Singh et al. | |
| 2016/0197910 | A1* | 7/2016 | Wadhwa | H04L 63/0815 |
| | | | | 726/4 |
| 2016/0224609 | A1* | 8/2016 | Seekircher | G06F 16/1844 |
| 2016/0224677 | A1* | 8/2016 | Goel | H04L 67/10 |
| 2016/0359955 | A1 | 12/2016 | Gill et al. | |
| 2017/0019364 | A1* | 1/2017 | Gamaley | H04L 67/327 |
| 2017/0093922 | A1 | 3/2017 | Duan | |
| 2017/0228182 | A1* | 8/2017 | Novak | G06F 3/0653 |
| 2017/0264618 | A1* | 9/2017 | Chandra | H04L 63/102 |
| 2018/0083980 | A1* | 3/2018 | Bond | H04L 63/105 |
| 2018/0173731 | A1* | 6/2018 | Nazari | G06F 3/0608 |
| 2018/0189121 | A1* | 7/2018 | Jobi | G06F 9/5016 |
| 2019/0155870 | A1* | 5/2019 | Prakash | G06F 40/103 |
| 2019/0220317 | A1* | 7/2019 | Bak | G06F 3/0623 |
| 2020/0341639 | A1* | 10/2020 | Cason | G06F 3/0631 |

OTHER PUBLICATIONS

T. E. Trueman and P. Narayanasamy, "Ensuring Privacy and Data Freshness for Public Auditing of Shared Data in Cloud," 2015 IEEE International Conference on Cloud Computing in Emerging Markets (CCEM), Bangalore, 2015, pp. 22-27. (Year: 2015).*

Kappes, Giorgos, and Stergios V. Anastasiadis. "Libservices: dynamic storage provisioning for multitenant I/O isolation." Proceedings of the 11th ACM SIGOPS Asia-Pacific Workshop on Systems. 2020, pp. 33-41. (Year: 2020).*

Harrington, Anthony, and Christian Jensen. "Cryptographic access control in a distributed file system." Proceedings of the eighth ACM symposium on Access control models and technologies. 2003, pp. 158-165. (Year: 2003).*

Janakiram, "Managing Persistence for Docker Containers", The New Stack, Sep. 2016, © 2017 The New Stack, printed Dec. 4, 2017, 21 pages. https://thenewstack.io/methods-dealing-container-storage/.

"aidanhs/dayer", GitHub, Docker layer toolbox, printed Dec. 4, 2017, 5 pages. https://github.com/aidanhs/dayer.

"moby/moby", GitHub, printed Dec. 4, 2017, 11 pages. https://github.com/moby/moby/issues/7950.

* cited by examiner

SHARING OF DATA AMONG CONTAINERS RUNNING ON VIRTUALIZED OPERATING SYSTEMS

BACKGROUND

The present disclosure relates to the field of information technology. More specifically, this disclosure relates to the management of containers in a computing system.

Virtualization is commonplace in modern computing systems. Generally, the virtualization is aimed at creating virtual computing resources that emulate corresponding actual computing resources by software; this allows abstracting from an implementation of the virtual computing resources thereby improving flexibility and scalability.

SUMMARY

According to embodiments of the present disclosure, a method for managing containers isolating corresponding application environments from one or more shared operating systems in a computing system is disclosed. One or more relevant groups are determined among one or more candidate groups (each comprising private data in common among a plurality of the containers). The candidate groups are determined according to corresponding access commands submitted by the containers and the relevant groups are determined according to one or more relevance policies. The private data of the relevant groups are consolidated into corresponding shared data.

A further aspect provides a computer program product for implementing the method.

A further aspect provides a corresponding system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Different techniques are available for virtualization. Particularly, Virtual (computing) Machines (VMs) may be used to emulate corresponding physical (computing) machines (on a host computing machine). Each virtual machine comprises a full copy of an operating system and one or more software applications running on top of it. Alternatively, multiple instances of an operating system may be emulated by a single instance thereof (on a host computing machine) for running corresponding (software) containers on top of them. In this case, each container comprises one or more software applications but without the operating system; the virtualization engine shares the operating system with all the containers, by isolating them via resource isolation features directly provided by the operating system itself. The containers are light with a typical size of tens of MBs (instead of tens of GBs as the virtual machines) and start almost immediately (instead of requiring a relatively slow boot as the virtual machines do).

Each container has a (virtual) filesystem comprising a read-only (image) layer corresponding to a software image from which the container is instantiated and a read-write (working) layer dedicated to the container for performing any writing operations required by it (initially empty); particularly, the working layer is used to update any files of the software image with a copy-on-write technique (wherein the files are copied and updated into the working layer so that the container accesses their most recent version whereas any other containers instantiated from the same software image continue to access their original version in the corresponding image layers). This reduces storage usage by the containers and improves their performance at start time.

However, when a relatively high number of containers update several files of their software images, the copies thereof in the corresponding working layers may involve an intense storage usage in the host computing machine; this may create shortage of storage space and it may adversely affect performance of the host computing machine (and then of the software applications running thereon). A typical example is in a cloud computing environment, when multiple users of an organization may require a same service based on one or more containers (wherein the waste of storage space for their working layers accordingly increases a corresponding Total Cost of Ownership (TCO) of the service).

In different contexts, Single-Instance Storage (SIS) techniques are available to eliminate replication of data by storing a single copy of each piece of data that is shared by multiple entities (for example, in backup applications). However, these techniques are not applicable to the containers. Indeed, the containers are live entities that are generally highly dynamic, with a large number of files that may be continually updated. Therefore, this may involve very frequent consolidations of the files that are shared among multiple containers; however, at the same time this may involve very frequent replications of the shared files as soon as they are updated by anyone of the containers. The corresponding overhead may then be untenable from a performance point of view.

With reference in particular to FIG. 1A-FIG. 1D, the general principles are shown of the solution according to an embodiment of the present disclosure.

Figure 1A:
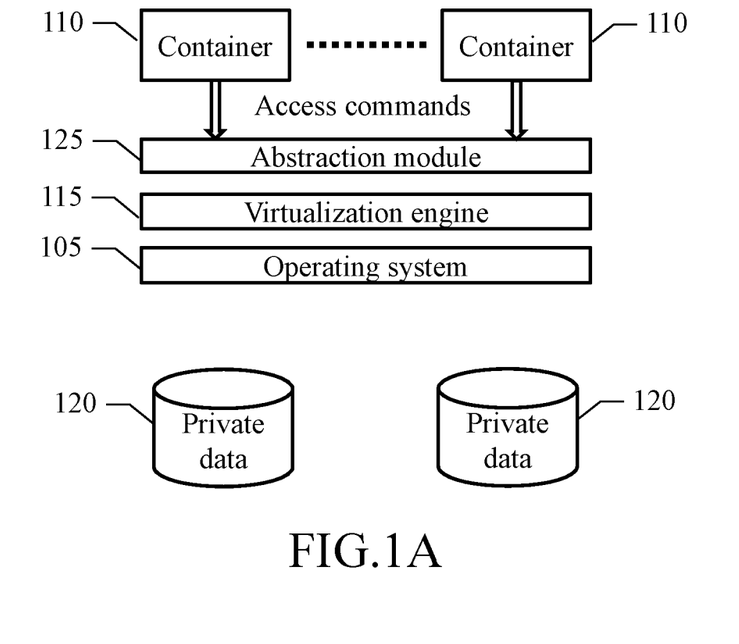
FIG. 1A-FIG. 1D show the general principles of the solution according to an embodiment of the present disclosure.

Starting from FIG. 1A, a computing system comprises one or more computing machines (not shown in the figure) each running its own operating system 105 (only one shown in the figure). Each operating system 105 is virtualized to emulate multiple instances thereof, on top of which corresponding (software) containers 110 may run, for example, under the control of a virtualization engine 115 exploiting resource isolation features provided by the operating system 105 itself. Each container 110 stores private data thereof 120, for example, into a read-write layer that is added to a read-only layer corresponding to a software image of the container (not shown in the figure). The containers 110 submit access commands (to the virtualization engine 115) for accessing the corresponding private data 120 (for example, for reading/writing them).

In the solution according to an embodiment of the present disclosure, these access commands are intercepted, for example, by an abstraction module 125 that is registered with the virtualization engine 115 for managing a storage facility of the computing system.

Figure 1B:
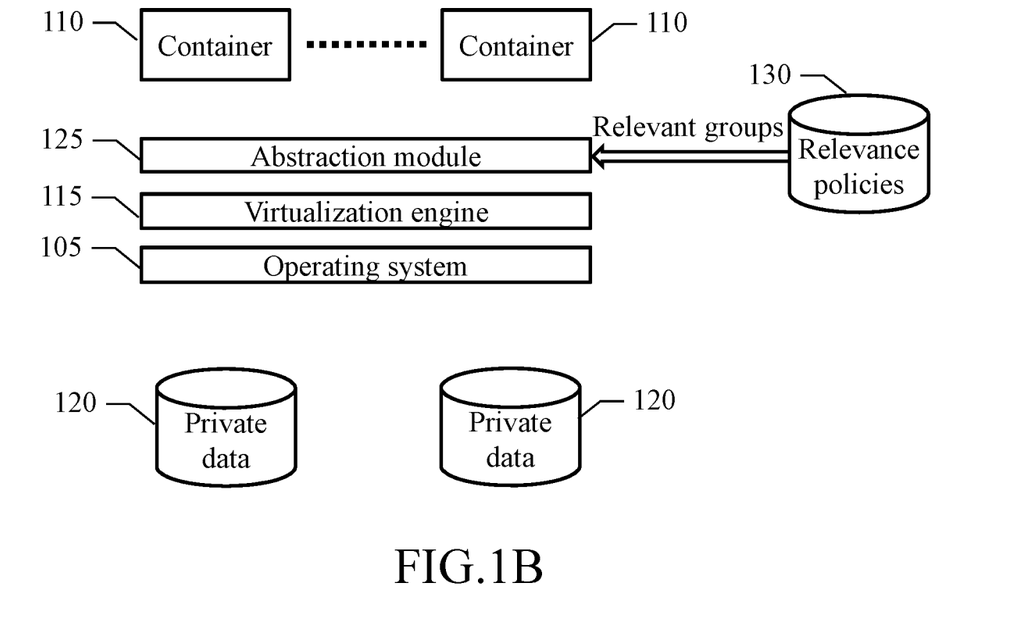

Moving to FIG. 1B, one or more candidate groups are determined (for example, by the abstraction module 125); each candidate group comprises private data 120 that are in common among a plurality of the containers 110 (for example, common files). These private data 120 in common are determined according to the access commands (for example, when multiple containers 110 write files with the same contents). Among these candidate groups, one or more relevant groups (each of private data 120 that are in common among the containers 110 of the corresponding candidate group) are determined, for example, again by the abstraction module 125; the relevant groups are determined according to one or more relevance policies 130 (for example, when relating to the deployment of the same files for a specific service operation of the containers 110).

Figure 1C:
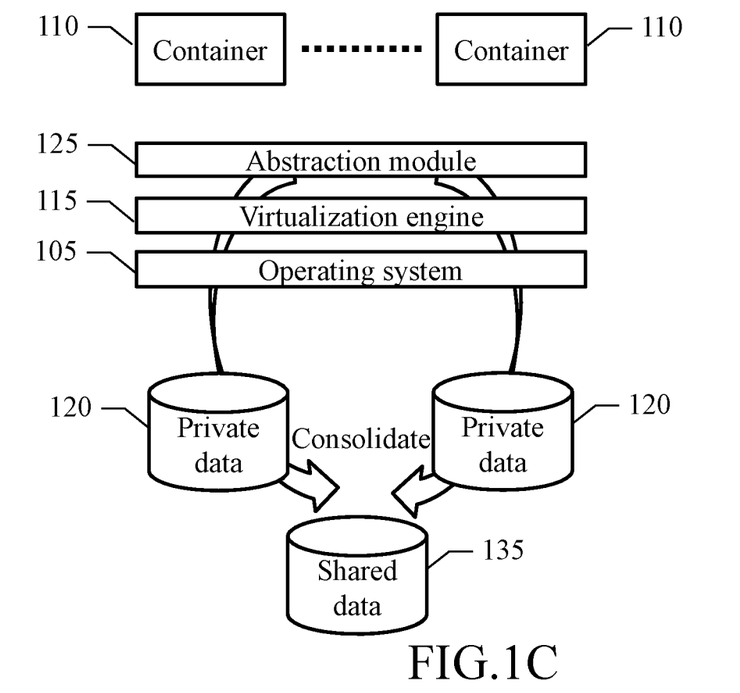

Moving to FIG. 1C, the private data 120 of the relevant groups are consolidated into corresponding shared data 135, for example, by the abstraction module 125; the shared data 135 store a single instance of the private data 120 that are in common among the corresponding containers 110 in each relevant group, thereby eliminating their replication. At the same time, the private data 120 of the relevant groups are mapped onto the corresponding shared data 135, for example, by updating a mapping table managed by the abstraction module 125 accordingly.

Figure 1D:
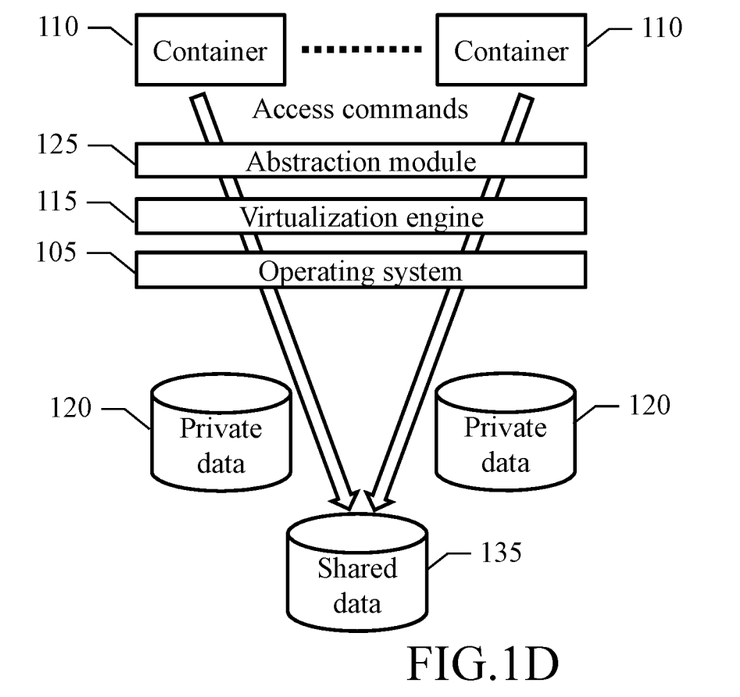

Moving to FIG. 1D, the access commands are implemented selectively according to the private data 120 to be accessed. Particularly, the access commands for the private data 120 of the relevant groups (as shown in the figure) access the corresponding shared data 135, for example, by executing them thereon by the abstraction module 125; otherwise, the access commands for the private data 120 that do not belong to any one of the relevant groups (not shown in the figure) access the corresponding private data 120 as usual, for example, by forwarding them from the abstraction module 125 to the virtualization engine 115.

The above-described solution reduces the replication of data (by storing a single copy of the private data that are shared by multiple containers). This accordingly reduces the corresponding storage usage in the computing system, thereby increasing the storage space that is available and the performance of the computing system (and then of the software applications running thereon).

At the same time, the proposed solution is not applied indiscriminately but selectively according to the relevance policies; in this way, it is possible to distinguish private data in common that are actually suitable to be shared at an application level. As a result, the sharing may be applied only when it is actually advantageous, i.e., when it is likely (for example, according to the functionality of the containers) that the corresponding private data that are in common will remain so for a relatively long time. This allows discarding private data in common that are instead updated continually, so that their sharing would require very frequent operations for replicating the corresponding shared data that may be updated later one by anyone of the containers. Therefore, the overhead of the computing system is significantly reduced, with beneficial effects on its performance.

In view of the above, a new level of abstraction is provided for the data as well, with a similar degree of flexibility, dynamicity and resiliency as provided by the containers themselves.

This is especially important in a cloud computing environment, for example, when multiple users of an organization may require a same service based on one or more containers (wherein the corresponding saving of storage space accordingly reduces a TCO of the service).

Figure 2:
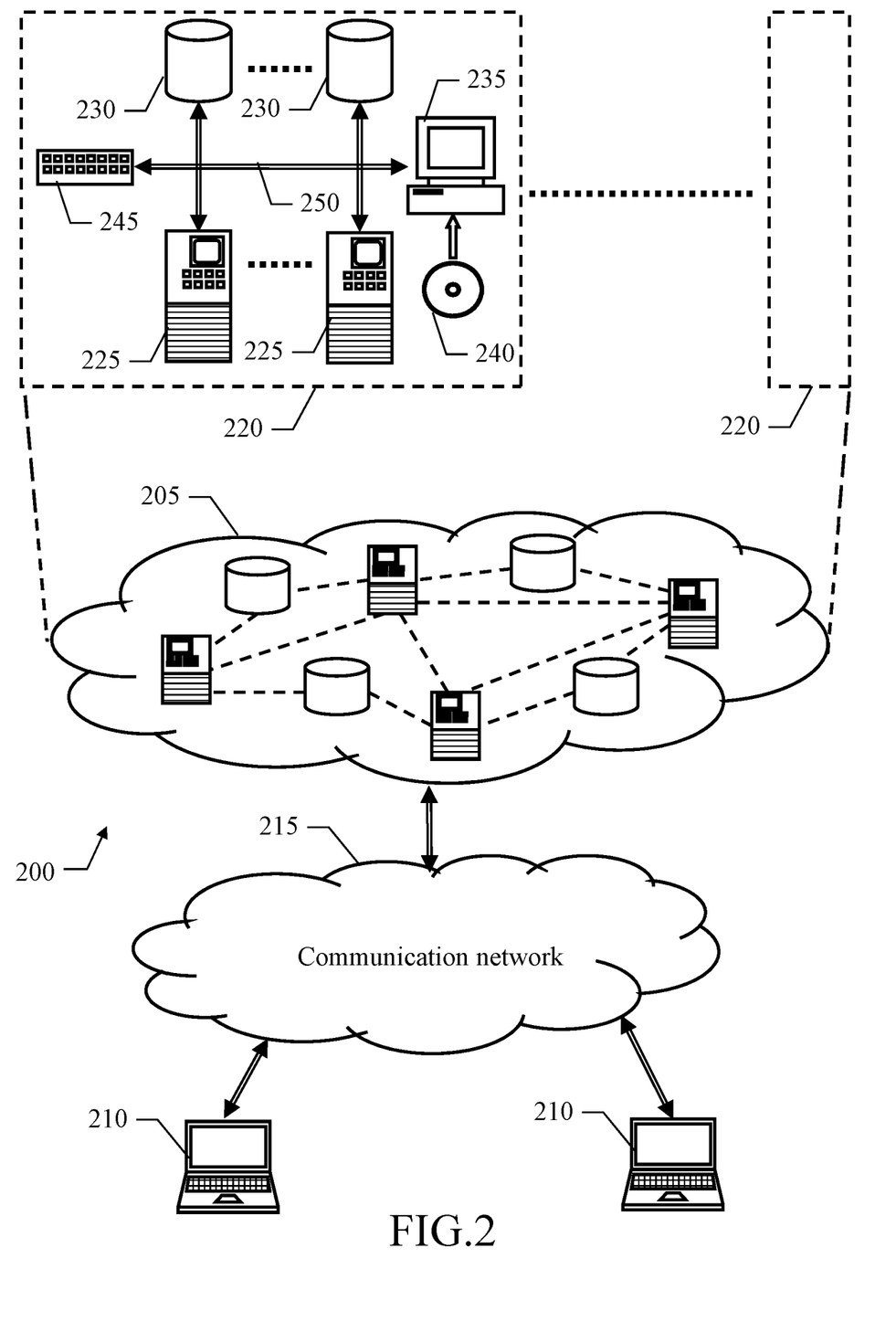
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

Particularly, the computing infrastructure 200 is based on a cloud computing environment that is used to supply cloud services on demand; the cloud computing environment may be based on different deployment models, for example, public cloud (i.e., for the general public). The computing infrastructure 200 comprises one or more cloud providers 205 (only one shown in the figure). Each cloud provider 205 supplies a pool of (hardware and/or software) computing resources as cloud services (i.e., shared computing resources that may be provisioned, configured and released very rapidly); the computing resources of the cloud services (generally of the virtual type) are supplied upon request to users of the cloud provider 205, so that each user has the sole control of these computing resources (which may then be used exactly as if they were dedicated thereto). The cloud services may be provided according to several service models, for example, Platform as a Service, or PaaS (providing software platforms, such as databases, web servers).

The users connect to the cloud provider 205 with corresponding client computing machines, or simply clients, 210 (for example, of the thin type) through a communication network 215, for example, based on the Internet in case of public cloud. For this purpose, the cloud provider 205 exposes a front-end component for accessing it (for example, via a web browser of the clients 210); moreover, the cloud provider 205 has a back-end component that actually implements the cloud services (which back-end component is not accessible from the outside, so that the users are completely agnostic about its location and configuration).

The cloud provider 205 is implemented in one or more server farms 220. Each server farm 220 comprises multiple server computing machines, or simply servers, 225 (for example, of the rack or blade type) and multiple storage disks 230 (for example, of the RAID type) implementing mass-memories thereof; in turn, each server 225 comprises one or more microprocessors (μP) controlling its operation, a non-volatile memory (ROM) storing basic code for a bootstrap thereof and a volatile memory (RAM) used as a working memory by the microprocessors (not shown in the figure). The server farm 220 also comprises a console 235 for controlling it (for example, a personal computer, also provided with a drive for reading/writing removable storage units 240, such as optical disks like DVDs). A switch/router sub-system 245 manages any communications among the servers 225, the disks 230 and the console 235, and with the communication network 215; for this purpose, the servers 225, the disks 230 and the console 235 are connected to the switch/router sub-system 245 (through corresponding network adapters) via a cabling sub-system 250.

Figure 3:
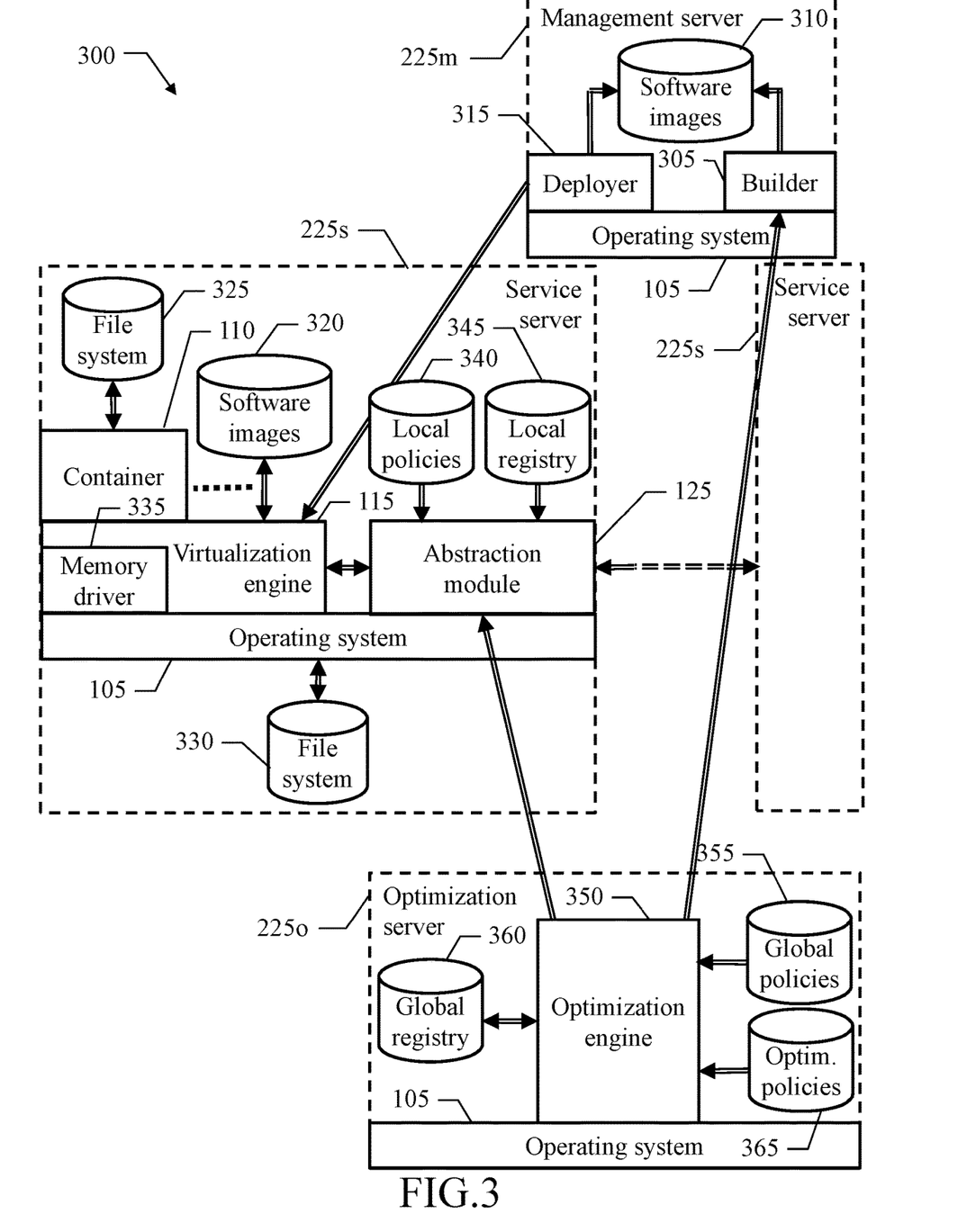
FIG. 3 shows the main software components that may be used to implement the solution according to an embodiment of the present disclosure.

With reference now to FIG. 3, the main software components are shown that may be used to implement the solution according to an embodiment of the present disclosure.

All the software components (programs and data) are denoted as a whole with the reference 300. The software components are typically stored in the mass memory and loaded (at least partially) into the working memory of each server when the programs are running. The programs are initially installed into the mass memory, for example, from removable storage units or from the communication network. In this respect, each program may be a module, segment or portion of code, which comprises one or more executable instructions for implementing the specified logical function.

One of the servers (or more) with its operating system 105 (referred to as management server and differentiated with the reference 225m) is used to manage the software images. The management server 225m comprises the following components. A builder 305 builds the software images. Each software image encapsulates the files residing on a computing machine, excluded its operating system, whose behavior has to be emulated. Typically, the software images have a modular structure based on multiple image layers; each software image is then defined by combining selected image layers, which define corresponding branches of a union filesystem grouping them together (so as to allow reuse of the image layers thereby reducing replication and fragmentation). The builder 305 accesses (in read/write mode) a (global) software image repository 310, which stores the image layers and a definition of the software images (in terms of their image layers) that are available in the computing system. A deployer 315 is used to deploy the software images into the computing system. For this purpose, the deployer 315 accesses (in read mode) the software image repository 310.

One or more others of the servers with their operating system 105 (referred to as service servers and differentiated with the reference 225s) are used to implement the services that are offered by the cloud provider. Each of the service server 225s comprises the following components. The virtualization engine 115 (for example, based on the Docker technology of Docker Inc., trademarks thereof) manages the containers 110 that are instantiated on the service server 225s. For this purpose, the virtualization engine 115 accesses (in read/write mode) a (local) software image repository 320, which stores the image layers and the definition of the software images that are used to instantiate its containers 110.

More specifically, the virtualization engine 115 emulates corresponding instances of the operating system 105 for the containers 110 (running on top of them). Each container 110 is a (stand-alone) executable package, which comprises everything required to run one or more software applications, for example, executable codes, system libraries, configurations (not shown in the figure) but without its operating system (or at least a kernel thereof). The containers 100 share the operating system 105. The virtualization engine 115 isolates the containers 110 by exploiting resource isolation features provided by the operating system 105; in this way, each container 110 runs in a corresponding process and may only use corresponding virtualized computing resources assigned thereto. As far as relevant to the present disclosure, the virtualization engine 115 emulates a (virtual) filesystem 325 for each container 110 defining a memory space thereof; the filesystem 325 provides a logical view of the data available to the container 110 independently of their actual structure in a filesystem 330 of the operating system 105; in turn, the filesystem 330 provides a logical view of the data available to the operating system 105 independently of their physical structure in the mass memory of the service server 225s (in case the filesystem 330 is of local type) or in the mass memory of all the service servers 225s of the computing system (in case the filesystem 330 if of network type). Whenever any container 110 is instantiated, it mounts its software image in read-only mode, by combining all the image layers of the software image via their union mounting into the filesystem 325. Moreover, the container 110 mounts a working layer (initially empty) in read-write mode, by adding this working layer to the filesystem 325 via its union mounting thereto. The virtualization engine 115 is provided with a default memory driver 335 for mapping the filesystem 325 onto the filesystem 330. Particularly, any writing (access) command involving the creation of new data is implemented directly onto the working layer. Any writing command involving the updating of data stored in the image layer is implemented with a copy-on-write technique; for this purpose, at first the data are copied into the working layer and then always accessed therein (so that any other containers 110 instantiated from the same software image continue to access the original version of the data in the software image). Any reading (access) command involving the reading of data is implemented onto the working layer if possible or onto the image layer otherwise (so that the container 110 always receives the most recent version of the data). Whenever any container 110 is deleted, its working layer is deleted along with it (so that any data written by the container 110 are lost).

In the solution according to an embodiment of the present invention, the abstraction module 125 registers as a custom memory driver (called volume plugin in Docker) with the virtualization engine 115. As a result, the abstraction module 125 replaces the default memory driver 335 for mapping the filesystem 325 onto the filesystem 330 (with the virtualization engine 115 that then passes all the access commands submitted by the containers 110 to the abstraction module 125, instead of the default memory driver 335, for implementing the above-mentioned sharing of data among all the containers 110 of the computing system). For this purpose, the abstraction module 125 communicates with the abstraction modules 125 of the other service servers 225s. Moreover, the abstraction module 125 accesses (in read mode) a local policy repository 340 with stores a local copy of policies to be used for managing the data of its containers 110. Particularly, the local policy repository 340 stores the relevance policies of interest. For example, one or more relevance policies are provided for each software image of the containers 110; the relevance policies of the software image specify data (such as files, folders) that are suitable to be shared among the containers 110 instantiated from the software image according to its applicative logic (for example, relating to its service operations, configurations). Moreover, the local policy repository 340 stores one or more criticality policies of interest. For example, one or more criticality policies are provided for each software image of the containers 110; the criticality policies of the software image specify data of the containers 110 instantiated from the software image that should be replicated and their number of copies according to the applicative logic of the software image (for example, relating to its high-availability service operations). The abstraction module 125 accesses (in read/write mode) a local registry 345 storing (local) data management information relating to the corresponding containers 110. Particularly, for each relevant group relating to one of these containers 110, the local registry 345 indicates its private data that are in common and a list of the containers 110 sharing them (each one identified by its service server 225s and a unique identifier therein), and it maps these private data to the corresponding shared data in the filesystem 330 (either locally or remotely). Moreover, for any private data of its containers 110 that are replicated the local registry 345 indicates their (local/remote) copies.

Another one of the servers (or more) with its operating system 105 (referred to as optimization server and differentiated with the reference 225o) is used to optimize the allocation of the containers 110 and their data at high level. The optimization server 225o comprises the following components. An optimization engine 350 collects the data management information of all the abstraction modules 125 and downloads the corresponding policies thereto. For this purpose, the optimization engine 350 communicates with the abstraction modules 125 of all the service servers 225s. The optimization engine 350 accesses (in read/write mode) a global policy repository 355 storing the (relevance/criticality) policies for all the software images and a global registry 360 storing (global) data management information relating to the whole computing system. Moreover, the optimization engine 350 accesses (in read/write mode) an optimization policy repository 365 storing one or more (high-level) optimization policies. Particularly, the optimization policy repository 365 comprises one or more promotion policies for promoting the shared data to software images. The promotion policies indicate conditions triggering the promotion of the shared data and the type of actions to be performed in response thereto. For example, the promotion policies indicate that the shared data are to be promoted when they have persisted for a time threshold; when a percentage of the corresponding containers, with respect to all the containers instantiated from the same (original) software image, reaches a first (lower) percentage threshold a new software image based on the original software image is to be created whereas when this percentage reaches a second (higher) percentage threshold the original software image itself has to be updated. Moreover, the optimization policy repository 365 comprises one or more relocation policies. The relocation policies indicate conditions triggering the movement of the containers and of their private data among different service servers 225s. For example, containers and/or private data are to be moved to allow sharing data when they are accessible only locally; in addition or in alternative, the containers and/or the private data thereof hosted on different service servers 225s are to be moved between them when corresponding transmission speeds fall below a transmission threshold.

Figure 4A:
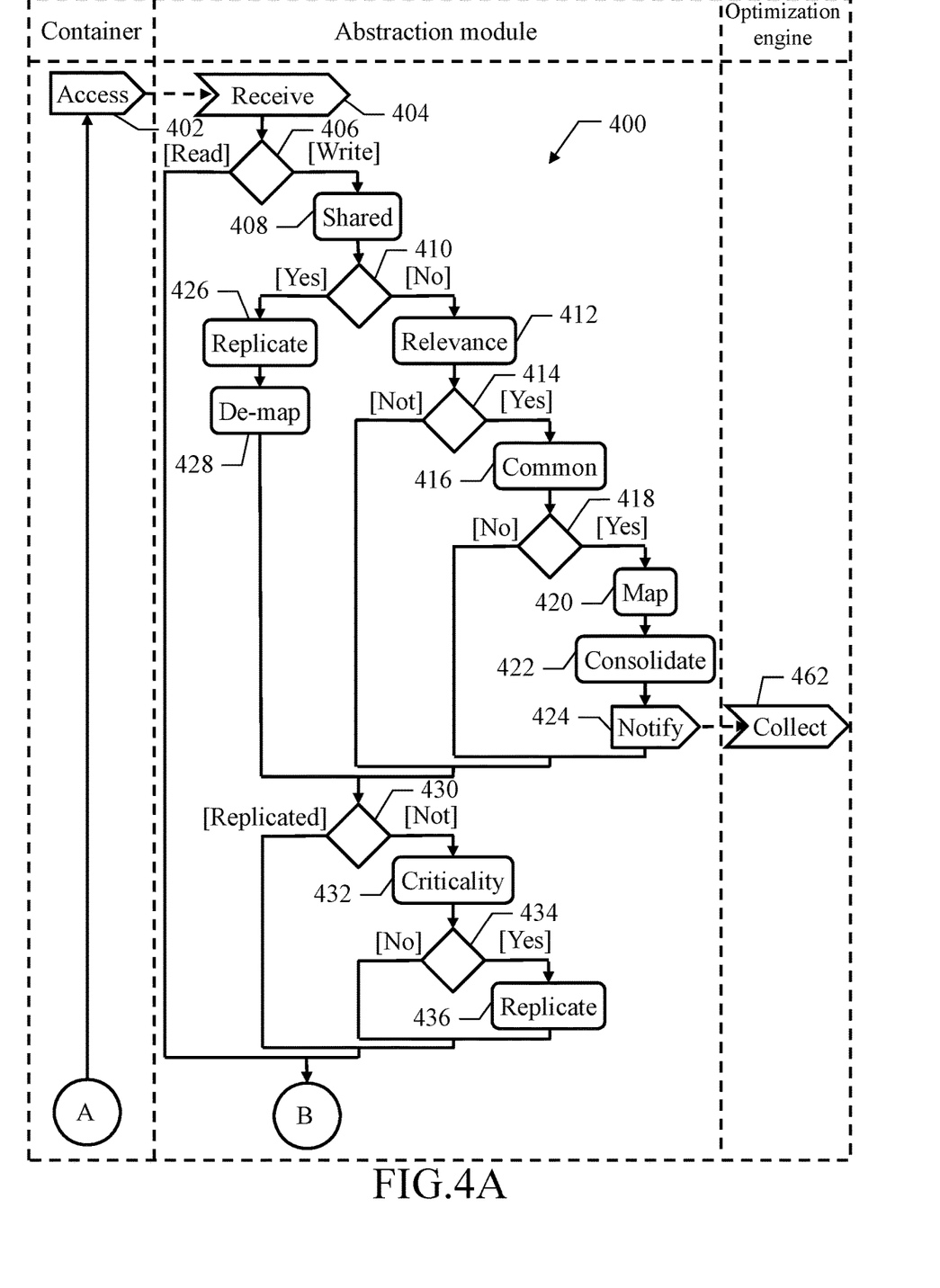
FIG. 4A-FIG. 4B show an activity diagram describing the flow of activities relating to an implementation of the solution according to an embodiment of the present disclosure.
Figure 4B:
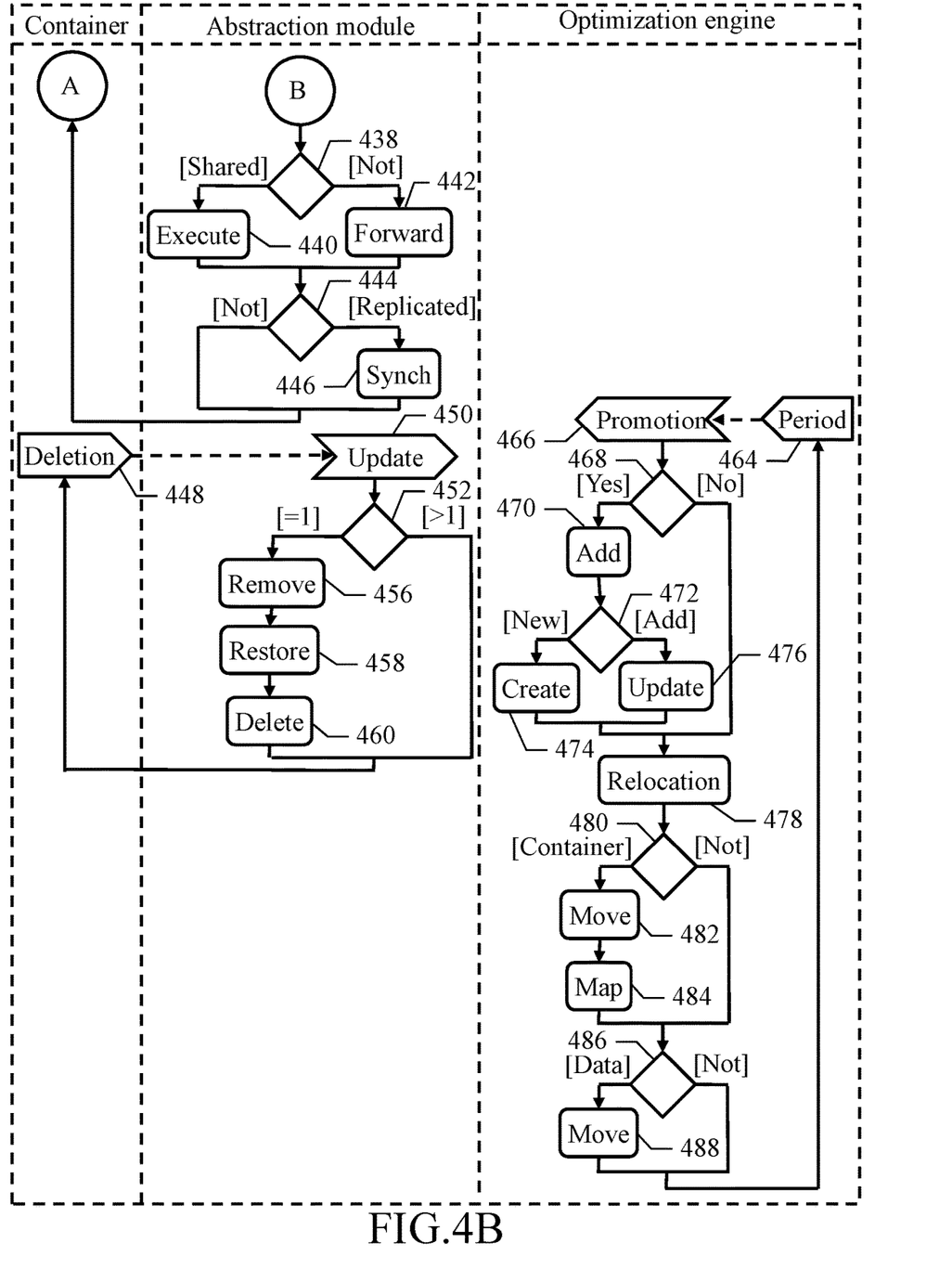

With reference now to FIG. 4A-FIG. 4B, an activity diagram is shown describing the flow of activities relating to an implementation of the solution according to an embodiment of the present disclosure.

Particularly, the diagram represents an exemplary process that may be used to share data among the containers with a method 400. In this respect, each block may correspond to one or more executable instructions for implementing the specified logical function on the corresponding servers.

Starting from block 402 in the swim-lane of a generic container, it submits an access command for accessing corresponding data (for example, a file) in its filesystem. The virtualization engine receives the access command and passes it to the abstraction module, so that the abstraction module receives the access command at block 404 in its swim-lane. The flow of activity branches at block 406 according to the type of access command. In case of writing command, the abstraction module at block 408 verifies whether the corresponding (private) data to be written have been consolidated into shared data for the container; for this purpose, the abstraction module verifies whether a relevant group exists for the private data listing the container in its local registry. The flow of activity branches at block 410 according to a result of this verification. If the private data have not been consolidated into corresponding shared data for the container, the abstraction module at block 412 retrieves the relevance policies corresponding to the software image of the container (from its local policy repository). The abstraction module at block 414 verifies whether the private data fulfill these relevance policies. If so (meaning that the private data are suitable to be shared), the abstraction module at block 416 verifies whether the private data are in common with any other containers. For this purpose, the abstraction module verifies whether a relevant group exists for the private data (not listing the container) in its local registry or in the local registry of any other abstraction module; if not, the abstraction module verifies whether the same private data are stored in any other containers hosted on its service server, and it asks the other abstraction modules to perform the same verification. In this way, it is possible to determine private data that are in common at any level (even among different service servers that are completely decoupled to each other). The flow of activity branches at block 418 according to a result of this verification. If the private data are in common with one or more other containers, the abstraction module at block 420 maps the private data in common to the corresponding shared data. Particularly, when a relevant group already exists for the private data, the abstraction module simply copies the entry of the relevant group into its local registry if necessary (from the local registry of another abstraction module hosting the containers of the relevant group); in any case, the abstraction module adds the container to the list of the relevant group into its local registry, and it asks the abstraction modules hosting the other containers of the relevant group (if any) to perform the same operation. Otherwise, the abstraction modules hosting the containers storing the private data in common negotiate the selection of one of them for storing the corresponding shared data (for example, according to the available memory space of their service servers). This (selected) abstraction module copies the private data in common from the working layer of one of the containers hosted on its service server (selected in any arbitrary way) to a dedicated memory area of its operating system to create the corresponding shared data. At this point, the selected abstraction module adds a new entry for the relevant group of the private data in common with the list of the corresponding containers and a mapping of the private data in common to the shared data into its local registry, and it asks the abstraction modules hosting the other containers of the relevant group (if any) to perform the same operation. The abstraction module at block 422 consolidates the private data in common into the shared data. Particularly, the abstraction module deletes the private data from the working layer of the container or it avoids writing them therein. Moreover, when no relevant group already existed for the private data in common, the selected abstraction module deletes the private data in common from the working layers of the containers of the relevant group hosted on its service server, and it asks the abstraction modules of the service servers hosting the other containers of the relevant group (if any) to perform the same operation. The abstraction module at block 424 notifies the optimization engine accordingly (by transmitting the updated/new entry for the relevant group of the private data in common).

Referring back to the block 410, when the private data are consolidated into shared data for the container the updating thereof that will be caused by the writing command invalidates their sharing. Therefore, the abstraction module at block 426 replicates the shared data as corresponding private data into the working layers of the containers of the relevant group hosted on its service server, and it asks the abstraction modules of the service servers hosting the other containers of the relevant group (if any) to perform the same operation. The abstraction module at block 428 de-maps these (replicated) private data from the shared data; particularly, the abstraction module deletes the entry of the relevant group from its local registry, and it asks the abstraction modules of the service servers hosting the other containers of the relevant group (if any) to perform the same operation.

The flow of activity merges at block 430 from the block 414 when the private data do not fulfill the relevance policies, from the block 418 when the private data are not in common with any other container, from the block 424 or from the block 428. At this point, the abstraction module verifies whether the private data are replicated in the computing system. If not, the abstraction module at block 432 retrieves the criticality policies corresponding to the software image of the container (from the local policy repository). The abstraction module at block 434 verifies whether the private data fulfill these criticality policies. If so (meaning that the private data should be replicated), the abstraction module at block 436 updates its local registry accordingly. Particularly, the abstraction module negotiates the selection of other abstraction modules (in a number indicated in the criticality policies) for storing the corresponding copies of the private data (for example, according to the available memory space of their service servers); the abstraction module then adds a new entry for the private data to be replicated with the indication of their copies in the service servers of these (selected) abstraction modules to its local registry.

The flow of activity then continues to block 438; the same point is also reached directly from the block 406 (in case of reading command), from the block 430 (when the private data are already replicated) or from the block 434 (when the private data do not fulfill the criticality policies). The process now branches according to the type of the private data of the access command. If the private data are shared (as indicated in the local registry), the abstraction module at block 440 executes the access command onto the corresponding shared data; particularly, in case of reading command the abstraction module reads the shared data and returns them to the container (whereas in case of writing command of private data that have just been shared no operation is performed). Conversely, if the private data are not shared the abstraction module at block 442 forwards the access command to the default memory driver so as to cause it to execute the access command as usual (with copy-on-write technique in case of writing command relating to the image layer).

The flow of activity merges at block 444 from either the block 440 or the block 442. At this point, the abstraction module verifies whether, in case of writing command, the corresponding private data are replicated (as indicated in its local registry). If so, the abstraction module commands the other abstraction modules wherein the copies of the private data are stored to synchronize them with the private data as updated. This replication of the private data adds redundancy that increases data availability (for example, providing resiliency in case of failure of some service servers). At the same time, as above the replication of the private data is not applied indiscriminately, but selectively according to the criticality policies; in this way, it is possible to distinguish private data that actually require their replication (for example, at an application level). The process then returns to the block 402 from the block 446 or directly from the block 444 (when the private data are not replicated) to repeat the same operations for any further access command.

In a completely independent way, a generic container is deleted at block 448 in its swim-lane. The virtualization engine notifies the deletion of the container to the abstraction module. In response thereto, the abstraction module at block 450 in the corresponding swim-lane updates its local registry accordingly. Particularly, the abstraction module removes the container from the lists of all the relevant groups in its local registry, and it asks the other abstraction modules to perform the same operation. For each of these relevant groups, the abstraction module at block 452 verifies the number of containers remained in the corresponding list. If a single container has remained in the relevant group (meaning that the corresponding private data are not shared any longer), the abstraction module at block 456 removes the relevant group (not existing any longer) from its local registry, and it asks the other abstraction modules to perform the same operation. The abstraction module at block 458 restores the shared data as corresponding private data into the working layer of the remaining container or it asks the corresponding abstraction module to perform this operation. The abstraction module at block 460 then deletes the shared data or it asks the corresponding abstraction module to perform this operation. The process then returns to the block 448 from the block 460 or directly from the block 452 (when two or more containers remained in the relevant group) to repeat the same operations for the deletion of any further container.

With reference now to the swim-lane of the optimization engine, it receives at block 462 the notification of any updated/new entry for the relevant group of the private data in common from the corresponding abstraction module (at the block 424); in response thereto, the optimization engine updates the global registry accordingly. In a completely independent way, the process passes from block 464 to block 466 as soon as a predefined period expires (for example, every 1-5 s). At this point, the optimization engine verifies the promotion policies extracted from the optimization policy repository (according to the content of the global registry). The flow of activity branches at block 468 according to a result of this verification. If the shared data of any relevant group fulfill the promotion policies, the optimization engine at block 470 commands the builder (in the management server) to add a new image layer based on the shared data into the global software image repository. The flow of activity then branches at block 472 according to the type of action to be performed (as indicated in the promotion policies). For example, when a new software image is to be created the process descends into block 474; at this point, the optimization engine commands the builder to add a new software image, defined by the image layers of the software image corresponding to the relevant group plus the image layer corresponding to its shared data, to the global software image repository. Conversely, when the software image corresponding to the relevant group is to be updated the process descends into block 476; at this point, the optimization engine commands the builder to add the image layer corresponding to the shared data to the definition of the software image corresponding to the relevant group into the global software image repository.

The process descends into block 478 from either the block 474 or the block 476; the same point is also reached directly from the block 468 when the shared data of no relevant group fulfill the promotion policies. The optimization engine now verifies the relocation policies extracted from the optimization policy repository (according to the content of the global registry). The flow of activity branches at block 480 according to a result of the verification of the relocation policies relating to the containers. If any (remote) container fulfills the relocation policies, the optimization engine at block 482 moves the container from its (original) service server to the (target) service server of its shared data; particularly, the optimization engine commands the virtualization engine of the target service server to download the software image of the container from the management server (if necessary) and then to instantiate the container from it. Once this operation has been completed, the optimization engine at block 484 commands the virtualization engine of the target service server to map the working layer of the container (remotely) to its working layer in the original service server; at this point, the optimization engine commands the virtualization engine of the target service server to start the container hosted thereon (so as to replace the container hosted on the original service server), and it commands the virtualization engine of the original service server to delete the container hosted thereon. In this way, the movement of the container is seamless. The process continues to block 486 from the block 484 or directly from the block 480 (when no container fulfills the relocation policies). The flow of activity now branches according to the result of the verification of the (further) relocation polices relating to the private data. If any (remote) private data fulfill the relocation policies, the optimization engine at block 488 moves the private data from its (original) service server to the (target) service server of its container. Particularly, the optimization engine commands the virtualization engines of the original service server and of the target service server to start copying the current version of the private data from the first one to the second one, to log any following changes of the private data in the original service server and, once the copy has been completed, to apply these changes to the private data in the target service server; once the copy of the private data has been completed, the optimization engine commands the virtualization engine of the target service server to map the private data (locally) to its copy stored therein, and it commands the virtualization engine of the original service server to delete the private data. The process then returns to the block 464 from the block 488 or directly from the block 486 (when no private data fulfill the relocation policies) to repeat the same operations periodically.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a plurality of containers. However, the containers may be in any number and based on any technology.

In an embodiment, the containers isolate corresponding application environments from one or more shared operating systems in a computing system. However, the containers may run any application programs (for example, implementing real-time services, batch processing) on any number and type of shared operating system hosted on any computing system (for example, one or more physical computing machines, one or more virtual computing machines or any combination thereof).

In an embodiment, the method comprises intercepting by the computing system access commands. However, the access commands may be intercepted in any way (for example, by the virtualization engine that passes them to any module registered therewith, by wrapping the virtualization engine, by hooking techniques applied outside the virtualization engine).

In an embodiment, the access commands are submitted by the containers for accessing private data thereof. However, the access commands may involve any type of operation (for example, reading, writing, copying, moving, renaming) for any type of private data (for example, files, folders, databases).

In an embodiment, the method comprises determining by the computing system one or more relevant groups among one or more candidate groups. However, the candidate/relevant groups may be in any number and determined in any way (for example, by verifying whether the private data fulfill the relevance policies and then whether they are in common among some containers, by determining the private data that are in common among some containers and then whether they fulfill the relevance policies).

In an embodiment, each of the candidate groups comprises private data in common among a plurality of the containers. However, the private data that are in common among any number of containers may be of any type (for example, files, folders, databases, customizations or any portions thereof).

In an embodiment, the candidate groups are determined according to the access commands. However, the private data that are in common may be determined in any way (for example, when they are the same for a minimum number of containers, down to two, and/or when they remain so for a minimum period, down to zero).

In an embodiment, the relevant groups are determined according to one or more relevance policies. However, the relevant groups may be determined in any way (for example, by applying rules, cognitive techniques) according to any number and type of relevance policies (for example, static, dynamic, dependent on an application logic, of general type, defined at any level such as locally for each service server, each server farm, each sub-network or globally for the whole computing system).

In an embodiment, the method comprises consolidating by the computing system the private data of the relevant groups into corresponding shared data. However, the private data of the relevant groups may be consolidated in any way (for example, into one of the corresponding service servers selected in any way, such as according to one or more characteristics of the service servers like memory space, processing power, workload or any combination thereof, always in the service server of the access command, by maintaining a copy of the private data, by copying the private data to a dedicated shared memory area either locally or remotely).

In an embodiment, the method comprises accessing by the computing system the corresponding shared data in response to the access commands for the private data of the relevant groups or the private data otherwise. However, the shared data may be accessed in place of the corresponding private data in any way (for example, by mapping the private data to the shared data, by creating corresponding links).

In an embodiment, the containers have filesystems thereof. However, the filesystems may be of any type (for example, local and/or network filesystems).

In an embodiment, the filesystems of the containers comprise corresponding image layers mounted in read-only mode each storing a selected one of one or more software images. However, the software images may be in any number and of any type (for example, each comprising the whole operating system, its kernel only, any number and type of additional software programs).

In an embodiment, the filesystems of the containers comprise corresponding working layers mounted in read-write mode each for storing the private data of the container comprising any updates of the software image thereof. However, the possibility is not excluded of applying the sharing to any other data of the containers (for example, at the level of their entire filesystems).

In an embodiment, the method comprises determining by the computing system the candidate groups each comprising private data in common among a plurality of the containers corresponding to a same one of the software images. However, the private data in common may be determined in any other way (for example, among the containers corresponding to groups of software images or among all the containers indiscriminately).

In an embodiment, the method comprises determining the relevance policies for each of the candidate groups according to the corresponding software image. However, the relevance policies may be determined in any other way (for example, according to groups of software images) or they may be always the same for all the containers indiscriminately.

In an embodiment, the method comprises selecting one or more of the relevant groups as promoted groups according to one or more promotion policies. However, the promoted groups may be determined in any way (for example, by applying rules, cognitive techniques) according to any number and type of promotion policies (for example, static, dynamic, dependent on an application logic, of general type); moreover, the promoted groups may be used for any purpose (for example, for creating new software images and/or updating corresponding software images, either for general use or for specific uses only), with this feature that may also be omitted at all.

In an embodiment, the method comprises creating corresponding new software images for the promoted groups, with each of the new software images that is created from the corresponding software image and the shared data of the corresponding promoted group. However, the new software images may be created in any way (for example, by adding a corresponding image layer or by creating a complete new software image).

In an embodiment, the method comprises adding the shared data of each of the promoted groups to the corresponding software image. However, the shared data may be added to the software image in any way (for example, by creating a corresponding image layer or by updating the software image).

In an embodiment, the computing system comprises corresponding virtualization engines running on the operating systems for managing the corresponding containers. However, the virtualization engines may be of any type (for example, external to the operating systems or embedded therein).

In an embodiment, the computing system comprises corresponding abstraction modules registered with the virtualization engines for managing a storage facility of the computing system. However, the abstraction modules may be of any type (for example, plug-ins of the virtualization engines, external modules by-passing the virtualization engines, customizations of the virtualization engines).

In an embodiment, the method comprises intercepting the access commands by the corresponding abstraction modules. However, the possibility is not excluded of having this operation performed by any other entity (for example, the virtualization engine itself).

In an embodiment, the method comprises determining the relevant groups by the abstraction modules. However, the possibility is not excluded of having this operation performed by any other entity (for example, an external inference engine).

In an embodiment, the method comprises consolidating the private data of the relevant groups by the abstraction modules. However, the possibility is not excluded of having this operation performed by any other entity (for example, a central consolidator engine).

In an embodiment, the method comprises accessing the corresponding shared data in response to the access commands for the private data of the relevant groups by the corresponding abstraction modules or forwarding the access commands from the corresponding abstraction modules to the corresponding virtualization engines otherwise. However, the possibility is not excluded of having this operation performed by any other entity (for example, completely by the abstraction module or the virtualization engine).

In an embodiment, the abstraction modules are a plurality of abstraction modules that are inter-communicating. However, the abstraction modules may be in any number (down to a single one or multiple ones on a single computing machine) and they may communicate among them in any way (for example, remotely and/or locally, directly or through a central hub).

In an embodiment, the abstraction modules are inter-communicating for determining the relevant groups. However, the relevant groups may be determined in any way (for example, locally or centrally); in any case, the possibility is not excluded of determining the relevant groups only at the level of each computing machine individually.

In an embodiment, the abstraction modules are inter-communicating for consolidating the private data. However, the private data may be consolidated in any way (for example, locally or centrally); in any case, the possibility is not excluded of consolidating the relevant group only on each computing machine.

In an embodiment, the method comprises determining by the computing system critical data of the private data according to one or more criticality policies. However, the critical data may be determined in any way (for example, by applying rules, cognitive techniques, either locally or centrally) according to any number and type of criticality policies (for example, static, dynamic, dependent on an application logic, of general type); moreover, the critical groups may be used for any purpose (for example, for creating copies, adding error detection/correction codes), with this feature that may also be omitted at all.

In an embodiment, the method comprises creating by the computing system one or more copies of the critical data. However, the copies may be in any number and they may be created in any way (for example, remotely and/or locally, in other containers or in dedicated memory areas).

In an embodiment, the method comprises synchronizing by the computing system the copies of the critical data according to the corresponding access commands.

However, the copies of the critical data may be synchronized in any way (for example, by updating them or simply logging their updates).

In an embodiment, the computing system comprises a plurality of computing machines each hosting a corresponding one of the operating systems. However, the computing machines may be in any number and of any type (for example, servers, clusters).

In an embodiment, the computing system comprises a communication network for communicating among the computing machines. However, the communication network may be of any type (for example, local, geographic, global one).

In an embodiment, the method comprises determining by the computing system remote one or more of the containers of one or more of the relevant groups that are hosted on corresponding original ones of the computing machines (different from target ones of the computing machines hosting the corresponding shared data) according to one or more relocation policies. However, the remote containers may be determined in any way (for example, by applying rules, cognitive techniques) according to any number and type of relocation policies (for example, static, dynamic, dependent on an application logic, of general type); moreover, the remote containers may be used for any purpose (for example, moving the containers, updating operation of a corresponding portion of the communication network), with this feature that may also be omitted at all.

In an embodiment, the method comprises moving by the computing system the remote containers to the corresponding target computing machines. However, the remote containers may be moved in any way (for example, in warm or cold way).

In an embodiment, the method comprises mapping the private data of the remote containers in the corresponding target computing machines to the corresponding private data in the corresponding original computing machines. However, the possibility is not excluded of moving the corresponding private data together with the containers.

In an embodiment, the method comprises determining by the computing system remote ones of the private data hosted on computing machines different from the computing machines hosting the corresponding containers according to further relocation policies. However, the remote private data may be determined in any way (for example, by applying rules, cognitive techniques) according to any number and type of further relocation policies (for example, static, dynamic, dependent on an application logic, of general type); moreover, the remote private data may be used for any purpose (for example, moving them, updating operation of a corresponding portion of the communication network), with this feature that may also be extended to the shared data or omitted at all.

In an embodiment, the method comprises moving by the computing system the remote private data to the computing machines hosting the corresponding containers. However, the remote private data may be moved in any way (for example, in warm or cold way).

In an embodiment, the computing system comprises an optimization engine for all the computing machines. However, the optimization engine may be located everywhere (for example, on a dedicated computing machine or on one of the computing machines hosting the virtualization engines) or it may be omitted at all.

In an embodiment, the method comprises collecting by the optimization engine data management information indicative of the shared data and the corresponding containers from the computing machines. However, the data management information may be of any type (for example, further comprising information about configuration, workload and/or performance of the computing machines) and it may be collected in any way (for example, in push or pull mode).

In an embodiment, the method comprises determining by the optimization engine the remote containers further according to the data management information. However, the remote containers may be determined in any way (for example, centrally or locally).

In an embodiment, the method comprises determining by the optimization engine the remote private data according to the data management information. However, the remote private data may be determined in any way (for example, centrally or locally).

In an embodiment, the containers implement one or more services in a cloud computing environment. However, the containers may implement any number and type of services (for example, PaaS, IaaS, SaaS, NaaS) in any cloud computing environment (for example, of public, private, hybrid type); in any case, the same solution may be applied to any other computing environment (for example, client-server, stand-alone).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, the computer program product comprising a computer readable storage medium having program instructions embodied therewith, the program instructions readable by a computing system to cause the computing system to perform the same method. However, the software program may be implemented as a stand-alone module, as a plug-in for a pre-existing software program (for example, each virtualization engine), or even directly in the latter. In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the computing system may comprise any number and type of computing machines (for example, of physical and/or virtual type) and it may have any architecture (distributed with the computing machines communicating among them via any local, wide area, global, cellular or satellite network and exploiting any type of wired and/or wireless connections, or even stand-alone).

Generally, similar considerations apply if the system has a different structure or comprises equivalent software components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing a plurality of containers isolating corresponding application environments from one or more shared operating systems in a computing system, the method comprising:
    intercepting, by the computing system, access commands submitted by the plurality of containers for accessing private data thereof, wherein the plurality of containers have filesystems thereof comprising corresponding image layers mounted in read-only mode each storing a selected one of one or more software images and corresponding working layers mounted in read-write mode each for storing the private data of the container comprising any updates of the software image thereof;
    determining, by the computing system, one or more relevant groups among one or more candidate groups each comprising private data in common among the plurality of the containers, the one or more candidate groups being determined according to the access commands submitted by different containers for the same content in their respective private data and the one or more relevant groups being determined according to one or more relevance policies;
    copying, by the computing system, first private data of a first relevant group of the one or more relevant groups from the working layer of one of the plurality of containers to a dedicated shared memory area;
    consolidating, by the computing system, the private data of the one or more relevant groups into corresponding shared data by deleting the first private data from working layers of one or more containers in the first relevant group; and
    accessing, by the computing system, the corresponding shared data in response to the access commands for the private data of the one or more relevant groups.

2. The method according to claim 1, further comprising:
    determining, by the computing system, the candidate groups each comprise private data in common among a plurality of the containers corresponding to a same one of the software images.

3. The method according to claim 2, further comprising:
    determining the relevance policies for each of the one or more candidate groups according to the corresponding software image.

4. The method according to claim 2, further comprising:
    selecting one or more of the relevant groups as promoted groups according to one or more promotion policies; and
    creating corresponding new software images for the promoted groups, each of the new software images being created from the corresponding software image and the shared data of the corresponding promoted group.

5. The method according to claim 2, further comprising:
    selecting one or more of the relevant groups as promoted groups according to one or more promotion policies, and
    adding the shared data of each of the promoted groups to the corresponding software image.

6. The method according to claim 1, wherein the computing system comprises corresponding virtualization engines running on the operating systems for managing the corresponding containers and corresponding abstraction modules registered with the virtualization engines for managing a storage facility of the computing system, and wherein the access commands are intercepted by the corresponding abstraction modules, and wherein the relevant groups are determined by the abstraction modules, and wherein the private data of the relevant groups are consolidated by the abstraction modules, and wherein the corresponding shared data is accessed in response to the access commands for the private data of the relevant groups by the corresponding abstraction modules.

7. The method according to claim 6, wherein the abstraction modules are a plurality of abstraction modules intercommunicating for determining the relevant groups and for consolidating the private data.

8. The method according to claim 1, further comprising:
    determining, by the computing system, critical data of the private data according to one or more criticality policies;
    creating, by the computing system, one or more copies of the critical data; and
    synchronizing, by the computing system, the copies of the critical data according to the corresponding access commands.

9. The method according to claim 1, wherein the computing system comprises a plurality of computing machines each hosting a corresponding one of the operating systems and a communication network for communicating among the computing machines, the method further comprising:
    determining, by the computing system, remote containers of the one or more containers of one or more of the relevant groups hosted on corresponding original ones of the computing machines, different from target ones of the computing machines hosting the corresponding shared data, according to one or more relocation policies;

moving, by the computing system, the remote containers to the corresponding target computing machines; and mapping the private data of the remote containers in the corresponding target computing machines to the corresponding private data in the corresponding original computing machines.

10. The method according to claim 9, wherein the computing system comprises an optimization engine for all the computing machines, the method further comprising:

collecting, by the optimization engine, data management information indicative of the shared data and the corresponding containers from the computing machines; and determining, by the optimization engine, the remote containers further according to the data management information.

11. The method according to claim 1, further comprising:

determining, by the computing system, remote ones of the private data hosted on computing machines different from the computing machines hosting the corresponding containers according to further relocation policies; and moving, by the computing system, the remote private data to the computing machines hosting the corresponding containers.

12. The method according to claim 11, wherein the computing system comprises an optimization engine for all the computing machines, the method comprising:

collecting, by the optimization engine, data management information indicative of the shared data and the corresponding containers from the computing machines; and determining, by the optimization engine, the remote private data further according to the data management information.

13. The method according to claim 1, wherein the containers implement one or more services in a cloud computing environment.

14. The method of claim 1, further comprising, in response to a write command for the first private data while the private data is in the dedicated shared memory area, replicating the private data to working layers of the containers in the first relevant group.

15. The method of claim 1, further comprising negotiating, among abstraction modules corresponding to containers in the first relevant group, for a selection of one of the abstraction modules for storing the first private data as shared data, wherein the copying is performed by the selected one of the abstraction modules.

16. The method of claim 15, wherein the negotiating is based on available memory space on corresponding servers for the abstraction modules.

17. The method of claim 15, further comprising: storing, by the selected one of the abstraction modules, an entry in a local registry for the first relevant group and a mapping to the first private data in the dedicated shared memory area.

18. The method of claim 17, further comprising instructing, by the selected one of the abstraction modules, the remainder of the abstraction modules to store the entry in their respective local registries.

19. A computer program product for managing a plurality of containers isolating corresponding application environments from one or more shared operating systems, the computer program product comprising a computer readable storage medium having program instructions embodied therewith, the program instructions readable by a computing system to cause the computing system to perform a method comprising:

intercepting access commands submitted by the plurality of containers for accessing private data thereof, wherein the plurality of containers have filesystems thereof comprising corresponding image layers mounted in read-only mode each storing a selected one of one or more software images and corresponding working layers mounted in read-write mode each for storing the private data of the container comprising any updates of the software image thereof;

determining one or more relevant groups among one or more candidate groups each comprising private data in common among the plurality of the containers, the one or more candidate groups being determined according to the access commands submitted by different containers for the same content in their respective private data and the one or more relevant groups being determined according to one or more relevance policies;

copying, by the computing system, first private data of a first relevant group of the one or more relevant groups from the working layer of one of the plurality of containers to a dedicated shared memory area;

consolidating the private data of the one or more relevant groups into corresponding shared data by deleting the first private data from working layers of one or more containers in the first relevant group; and accessing the corresponding shared data in response to the access commands for the private data of the one or more relevant groups.

20. A system for managing a plurality of containers isolating corresponding application environments from one or more shared operating systems, wherein the system comprises:

a circuitry for intercepting access commands submitted by the plurality of containers for accessing private data thereof, wherein the plurality of containers have filesystems thereof comprising corresponding image layers mounted in read-only mode each storing a selected one of one or more software images and corresponding working layers mounted in read-write mode each for storing the private data of the container comprising any updates of the software image thereof;

a circuitry for determining one or more relevant groups among one or more candidate groups each comprising private data in common among the plurality of the containers, the one or more candidate groups being determined according to the access commands submitted by different containers for the same content in their respective private data and the one or more relevant groups being determined according to one or more relevance policies;

a circuitry for copying first private data of a first relevant group of the one or more relevant groups from the working layer of one of the plurality of containers to a dedicated shared memory area;

a circuitry for consolidating the private data of the one or more relevant groups into corresponding shared data by deleting the first private data from working layers of one or more containers in the first relevant group; and a circuitry for accessing the corresponding shared data in response to the access commands for the private data of the one or more relevant groups.

* * * * *